(12) United States Patent
Paquin et al.

(10) Patent No.: US 6,511,695 B1
(45) Date of Patent: Jan. 28, 2003

(54) CONTINUOUS PROCESS OF DYNAMIC HIGH-PRESSURE HOMOGENIZATION FOR THE DENATURATION OF PROTEINS

(75) Inventors: Paul Paquin, Charny (CA); Johanne Lacasse, Charlesbourg (CA); Muriel Subirade, Silbery (CA); Sylvie Turgeon, Andrienne-Lorretto (CA)

(73) Assignee: Universite Laval, Québec (CA)

( * ) Notice: Subject to any disclaimer, the term of this patent is extended or adjusted under 35 U.S.C. 154(b) by 0 days.

(21) Appl. No.: 09/233,954

(22) Filed: Jan. 20, 1999

Related U.S. Application Data

(60) Provisional application No. 60/072,084, filed on Jan. 21, 1998, now abandoned.

(51) Int. Cl.[7] .................................. A23P 1/00; A23C 9/154
(52) U.S. Cl. .................................... 426/580; 426/519
(58) Field of Search ............................... 426/519, 583, 426/656, 573, 614, 655, 580; 530/427, 360, 365

(56) References Cited

U.S. PATENT DOCUMENTS 5,468,511 A * 11/1995 Zeidler ....................... 426/614
5,952,193 A * 9/1999 Shimamura et al. ......... 435/68.1

OTHER PUBLICATIONS

Lacasse et al., *Journal of Dairy Sci.*, vol. 80, Suppl. 1, p. 124, #D104, Jun. 1997.*
Pouliot et al., *J. Dairy Sci.*, vol. 80, Suppl. 1, p. 124, #D105, Jun. 1997.*
Cano–Ruiz et al., *J. Dairy Sci.*, 80:2732–2739, Nov. 1997.*
Lopez–Fandino et al., *J. Dairy Sci.*, 79:929–936, Jun. 1996.*

* cited by examiner

*Primary Examiner*—Keith Hendricks
(74) *Attorney, Agent, or Firm*—Swabey Ogilvy Renault; France Côté; Christian Cawthorn

(57) ABSTRACT

The present invention relates to a continuous process for denaturation of proteins, which comprises the steps of: a) subjecting a protein solution to a high pressure homogenizer at a pressure of about 500 to about 5000 bar, at a recirculation ranging from 0 to about 50 and at a temperature ranging from about 20° C. to about 80° C. for a period of time on the order of milliseconds, wherein the protein solution consisting of a protein fraction dispersed in water, buffer or salt solution at a concentration ranging from about 2% to about 35% w/w and at a pH adjusted between about 2.0 to about 12.0; b) concentrating the protein solution by i) evaporation, ii) ultrafiltration and sprayed dried or iii) ultrafiltration and freeze dried.

11 Claims, 17 Drawing Sheets

CONTINUOUS PROCESS OF DYNAMIC HIGH-PRESSURE HOMOGENIZATION FOR THE DENATURATION OF PROTEINS

CROSS REFERENCE TO RELATED APPLICATIONS

This application claims benefit under 35 U.S.C. §119(e) of U.S. provisional application No. 60/072,084, filed Jan. 21, 1998, now abandoned.

BACKGROUND OF THE INVENTION (a) Field of the Invention

The invention relates to a continuous process for the denaturation of proteins using dynamic high-pressure homogenization (HPH).

(b) Description of Prior Art

Whey proteins have been extensively studied for their structure and functional properties. Most of researchers have shown that whey proteins undergo denaturation when heat-treated at temperatures exceeding 60° C. (De Wit et al., 1988, IDF Symposium Quebec, Canada, 129–148). Recently, denaturation, aggregation and gelation processes of whey proteins have been described in three steps. The first step involves the unfolding of molecules followed by a second step which is related to the aggregation process of partially unfolded whey proteins. The last step involves the polymerization of the protein network which leads to gelation.

The use of high hydrostatic pressures on whey protein solutions have been reported to initiate protein-unfolding and result in gelation of protein solutions without heat-treatments (Hayakawa et al., 1992, J. Food Sci., 57:288–292; Johnston et al., 1992, Milchwissenchaft, 47:760–763). In these cases, the pressure caused a volume reduction in the solution which led to a reorganization of hydrogen bonds and hydrophobic interactions (Hoover et al., 1989, Food Technol., 43:99–107).

High-shear forces have also been shown to affect protein denaturation, as demonstrated by studies on denaturation of protein solutions by extrusion (shear forces) (Rha and Pradipasena, 1977, J. Texture Stud., 8:339; Ker and Toledo, 1992, J. Food Sci., 57:82–89; Taylor and Fryer, 1994, Food Hydrocolloids, 8:45–61). These results show that both high pressure (static) and shear forces can modify proteins by partial denaturation. However, these studies did not demonstrate that the use of both high pressures and shear forces together have a specific effect on the proteins. Also, static high pressure is limited because it is done in a batch system and not in a continuous process.

To date, there has not been shown a continuous process for the denaturation of proteins using dynamic high-pressure homogenization (HPH).

It would be highly desirable to be provided with partial or total denaturation of proteins using a continuous process consisting in a combination of shear forces cavitation and turbulences at high pressures with a very short heat treatment (milliseconds) in the reaction chambers of a high-pressure homogenization (HPH) equipment.

SUMMARY OF THE INVENTION

One aim of the present invention is to provide a continuous process for the denaturation of proteins using dynamic high-pressure homogenization (HPH).

Another aim of the present invention is to provide partial or total denaturation of proteins using a continuous process consisting in a combination of shear forces cavitation and turbulences at high pressures with a very short heat treatment (milliseconds) in the reaction chambers of a high-pressure homogenization (HPH) equipment.

The process of the present invention is used on food proteins to produce partial or total denaturation of proteins. The proteins are modified by the effect of dynamic high-pressure and possess different functional properties, such as solubility, emulsification, foaming or gelation, which in turn affect their use in food products (mayonnaise, salad dressing, meat emulsion, foam and mousse, among others).

In accordance with the present invention there is provided a continuous process for denaturation of proteins, which comprises the steps of:

a) subjecting a protein solution to a high pressure homogenizer at a pressure of about 500 to about 5000 bar, at a recirculation ranging from 0 to about 50 and at a temperature ranging from about 20° C. to about 80° C. for a period of time from about 1 milliseconds to about 10 minutes, wherein the protein solution consisting of a protein fraction dispersed in water, buffer or salt solution at a concentration ranging from about 2% to about 35% w/w and at a pH adjusted between about 2.0 to about 12.0;

b) concentrating the protein solution by i) evaporation, ii) ultrafiltration and sprayed dried or iii) ultrafiltration and freeze dried.

The denaturation may be partial or total.

The protein fraction may be selected from the group consisting of egg, milk, and vegetable.

The preferred milk protein is whey protein.

The protein may be a protein concentrate at a concentration about 35% to about 99%.

The whey protein is a whey concentrate or a whey isolate.

The whey protein is at a concentration about 35% to about 99%.

The preferred pH ranges between 6.0 to about 7.0 and the preferred protein fraction is at a concentration of about 5% to about 14%.

The preferred pressure is more than 1500 bar, the temperature is 22° C. or 55° C. and the preferred recirculation is ranging from 1 to 5.

In accordance with the present invention there is provided a food protein composition, which comprises partially or totally denatured protein with enhanced viscosity and gel firmness properties, with higher solubility, wherein the protein is obtained by the process of the present invention.

For the purpose of the present invention the following terms are defined below.

The term "high homogenization pressure" is intended to mean a pressure between about 500 to about 5000 bar, with a preferred pressure of about 3 kbar.

The preferred protein used in accordance with the process of the present invention is whey protein.

DETAILED DESCRIPTION OF THE INVENTION

Figure 1:
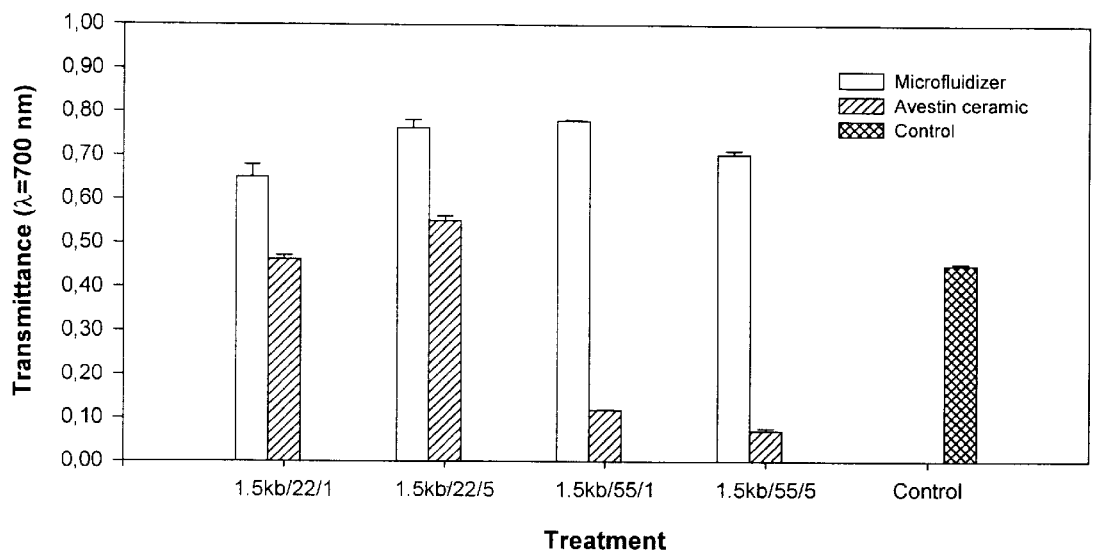
FIG. 1 illustrates the evaluation of turbidity by transmittance at λ=700 nm.

In accordance with the present invention, there is provided the denaturation of proteins using dynamic high pressure. Food protein, such as whey protein, dispersed at a concentration of about 2 to about 35% is treated by a high pressure homogenizer with a pressure of about 500 to about 5000 bar and of 0 to about 50 recirculations. Equipments which may be used in accordance with the present invention include, without limitation, Emulsiflex™ or Microfluidization equipments (sold by Avestin Canada, Microfluidic Booter). The treatment is carried out at a temperature ranging from about 20° C. to about 80° C. and at a pH ranging between about 2.0 to 12.0 for a period of time necessary to obtain the partial or total denaturation of proteins, from about 1 milliseconds to about 10 minutes. Finally, the solution is concentrated by evaporation or ultrafiltration and sprayed dried or freeze dried, with such conditions that are not detrimental to the ingredient.

The process of the present invention is a continuous process that denatures or modifies food protein and their functional properties. Various food proteins, such as milk, egg or vegetable, can be used. Generally, the invention gives good results with milk proteins, preferably whey proteins. Different whey protein fractions can be used, whey concentrate (35% to 90%) or preferably whey isolate, the latter has shown to give very good results. These protein ingredients are dispersed in water or in buffer or in salt solutions, at a concentration ranging from about 2% to about 35% w/w and adjusted at pH ranging from about 2.0 to about 12.0. Preferably at a pH ranging from about 6.0 to about 7.0 and at a concentration of about 5% to about 14%.

The protein solutions are treated by dynamic high pressure homogenizers using pressures ranging from 500 bar to about 5000 bar. Specific equipment is used to reach these high pressures (Collision-impact technology equipment U.S. Pat. No. 4,533,254 and a high pressure homogenizer from Avestin™, Emulsiflex™ C-5 or C-50).

In accordance with the process of the present invention, the modification of protein solutions requires the use of a combination of conditions, such as pressures ranging from 500 bar to about 5000 bar, number of recirculations from 0 to 50, temperature ranging between 20° C. to 80° C., and pH ranging from about 2.0 to about 12.0. The preferred pressure is a pressure exceeding 1500 bar, the preferred temperature is 22° C. or 55° C. and the preferred number of recirculation is ranging from 1 to 5.

In accordance with the process of the present invention, the dynamic high-pressure treatment affects protein suspensions in two different ways: first, the high pressure (500 to 2000 bar) disperses aggregates or soluble aggregates that are present in the solution; then at higher pressures (2000 to 5000 bar) the molecular structure of protein is affected. Protein denaturation or modification occurs in the reaction chambers, in the order of milliseconds, by a combination of different parameters including shear forces, cavitation, turbulence and a flash-heat treatment.

The specific design of the chambers of the high pressure equipment are critical in the process. Two types of equipment have been used to produce the modification. The first one is a Collision-impact technology equipment (U.S. Pat. No. 4,533,254) which has reaction chambers where the liquid is divided into two microchannels in which the solution is subjected to high-shear forces. Finally, the two jet streams of liquid end up in an impact area zone where the two liquids collide at a angle of about 1800, at this level both turbulence forces and cavitation are involved.

The chambers of the Avestin™ (Emulsiflex™ C-5 or C-50) equipments differs in their design; it resembles a conventional homogenization flat-bead valve, but a micrometric adjustment of the gap is necessary to reach such high pressures. These valves can also be made of different materials, such as stainless steal or ceramic for a better resistance to such high pressures. There are also different valve designs, such as flat-head or needle shape, that will give different results for specific applications.

After the pressure treatment, when the product exits the high pressure zone of the equipment, the solution is cooled down with refrigerated water in order to bring the temperature of the sample back to about 20° C. to 25° C.

The solution can be used in the liquid form or then be concentrated by evaporation or by membrane separation (ultrafiltration/microfiltration) in order to increase the total solid content of the solution. Afterwards the sample is spray dried using normal conditions which are inlet temperature of about 200° C. and outlet temperature of about 85° C.

Analyses of modified protein powders have shown that under specific conditions either protein aggregation is modified or molecular structure of the protein is affected.

Figure 7:
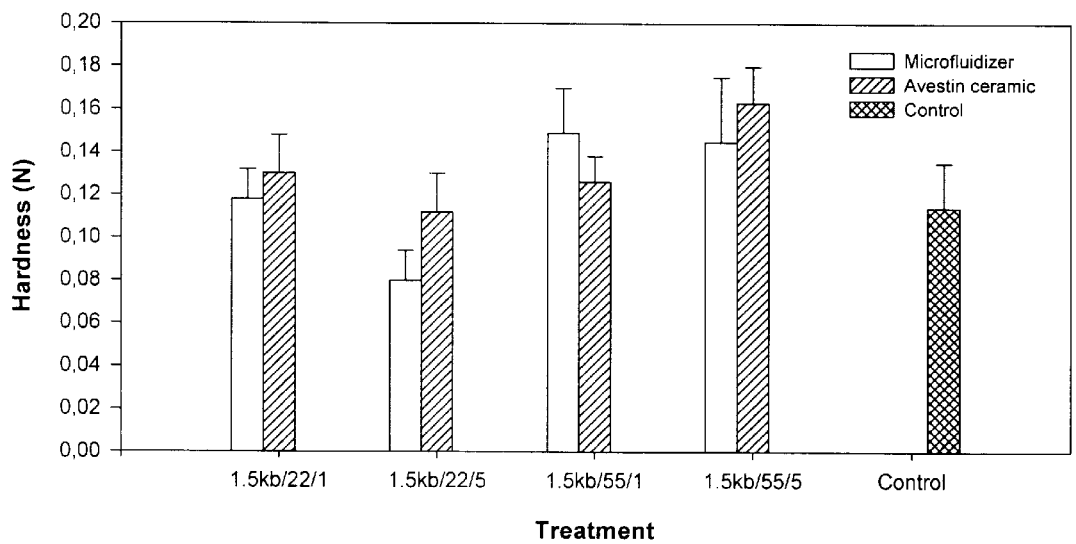
FIG. 7 illustrates effect of WPC treated by HPH on the hardness of gels.

For a whey protein isolate solution (14% w/w) microfluidized at 1000 bar for 5 recirculations the transparency of the solution is modified, as shown by measuring transmittance at 700nm. These results show that treated samples are more translucent than the non-treated samples, this suggests that some colloids ore aggregates have been disrupted by the HPH treatment. Heat-treated gels have been produced by heating the solutions at 80° C. for 30 minutes by immersing tubes in a water bath. Measurements of gel properties (deformation) have shown that treated samples produced harder gels than the non-treated samples (FIG. 7).

At pressures higher than 2000 bar under specific conditions, gelation can be directly produced by high pressure homogenization (no cooling on the chambers), without a subsequent heat treatment. For a whey protein isolate solution at 14% w/w, treated by high pressures of 2068 bar with 15 and/or 20 recirculations at pH 6.0 and 5 recirculations at pH 9.0 gelation can be obtained when the samples are held at 10° C. for 12 hours without a subsequent heat treatment (or 1500 bar/22° C./8 recirculations or 1500 bar/22° C./8 recirculations; Table 4). These gels possess textural characteristics comparable to the heat treated gels.

In order to characterized the protein modifications that have occurred in the protein due to the HPH treatment, different analysis of the basic functional properties have been realized.

1.0 STUDY OF WHEY PROTEIN ISOLATE (WPI) AND WHEY PROTEIN CONCENTRATE (WPC)

Protein substrates:
  Whey protein isolate (WPI, 97% Bipro)
  Whey protein concentrate (WPC 50%)
Parameters Evaluated:
  The reaction chambers: Microfluidizer 110 Y and Avestin C-50 ceramic
  Number of recirculation: 1 and 5 passes
  Temperature of homogenization 22° C. and 55° C.
Non Variable Parameters:
  Protein concentration: 14.00%
  pH of solution: 6.00
  Pressure of homogenization: 1500 Bar
Functional Properties Analysis:
  Solubility of protein
  Turbidity
  Emulsification
  Gelation

EFFECT OF HEATING ON GEL FORMATION WITH AVESTIN CERAMIC HOMOGENIZER

TABLE 1

| Experimental Process | | | |
|---|---|---|---|
| Substrates | Chambers | Passes | Temperature (° C.) |
| WPI control | | | |
| WPI | Microfluidizer | 1 | 22 |
| WPI | Microfluidizer | 5 | 22 |
| WPI | Microfluidizer | 1 | 55 |
| WPI | Microfluidizer | 5 | 55 |
| WPI | Ceramic | 1 | 22 |
| WPI | Ceramic | 5 | 22 |
| WPI | Ceramic | 1 | 55 |
| WPI | Ceramic | 5 | 55 |
| WPC control | | | |
| WPC | Microfluidizer | 1 | 22 |
| WPC | Microfluidizer | 5 | 22 |
| WPC | Microfluidizer | 1 | 55 |
| WPC | Microfluidizer | 5 | 55 |
| WPC | Ceramic | 1 | 22 |
| WPC | Ceramic | 5 | 22 |

TABLE 1-continued

| Experimental Process | | | |
|---|---|---|---|
| Substrates | Chambers | Passes | Temperature (° C.) |
| WPC | Ceramic | 1 | 55 |
| WPC | Ceramic | 5 | 55 |

METHODOLOGY FOR THE EVALUATION OF FUNCTIONAL PROPERTIES

Solubility of Protein

The protein solubility of WPI and WPC was determined at pH 6.0 and pH 4.6. The pH of a 1% true protein solution was adjusted to 6.0 or to 4.6 and centrifuged at 20,000 g for 15 minutes at 25° C. The protein content of the supernatant was measured by the Kjeldahl method (N×6.38). Soluble protein at pH 6.0 represents all proteins soluble and soluble protein at pH 4.6 represents the native or the non-denatured proteins. Total protein of WPI and WPC was also determined by the Kjeldahl method. The analyses were made in duplicate.

Turbidity

Solutions of WPI were prepared at a concentration of 14% w/w of protein and the pH was adjusted to 6.0. Degassed Protein solutions were put in a 3 ml polystyrene cuvette. The turbidity of the protein solutions was measured by transmittance at $\lambda=700$ nm with the 8451A diode array spectrophotometer.

Emulsion Preparation and Determination of Particle Size

The aqueous phase of the emulsion consisted of 0.5% protein of WPI or WPC. Corn oil (20%) and aqueous phase (80%) were homogenized together during 1 minute with the Ultra-Turax™ T25 high speed blender. This emulsion was then homogenized using the Emulsiflex™-C5 (Avestin™ Inc., Ottawa, Canada) at a pressure of 345 bar. Each sample was circulated 2 passes in the homogenizer. Emulsions were made in duplicate. The size of the oil droplet was measured using an optical microscope at 100× magnification with the image analyzer Matrox™ inspector. For each emulsion, six measures of the size of the oil droplets were realized. The analysis were made 24 hours after the production of the emulsions.

Gelation

The gels of WPI were made with a solution containing 14% w/w of protein and the pH was adjusted to 6.0. The protein solutions were degassed and put in glass tubes (7 mm diameter×14 cm longer). The tubes were closed with parafilm. The tubes were put in a heating bath at 80° C. during 30 minutes. The gels were refrigerated at 40° C. The gels were made in duplicate. The gels texture analysis was made after 18 hours with a Texturometer™ TA-XT2. The gels were put at room temperature (20° C.) one hour before the analysis. The gels were moved out of the tubes and they were cut in 11 cylinders (6 mm height×7 mm larger). A double compression at 20% of deformation was executed on the gels with a cylinder (2.5 cm diameter) at a moving speed of 0.5 mm/sec. Ten measures were executed for each preparation of gel. The texture profile analysis (TPA) was realized to determined the hardness of the gels.

Effect of Heating

Solution of WPI at a protein content of 14% w/w and at a pH of 6.0 was used. 200 ml of the solution was passed in the homogenizer EmulsiFlex™-C50 (Avestin™ Inc. Ottawa, Canada) with the ceramic chamber at a pressure of 1.5 kbar. Two temperatures of inlet were evaluated: 22° C. and 55° C. The time and the number of the passes were calculated until the solution was a gel. The tests were made in duplicate.

RESULTS

Solubility of Protein

Table 2 presents the different protein fractions in WPI and WPC products. Total proteins content were relatively the same for all types of WPI products and all types of WPC products. WPC products showed a higher content of insoluble aggregated protein (IAP) compared to the WPI products. The high-pressure homogenization (HPH) treatment had no effect on the content of IAP because the value for the WPI and WPC control were similar to WPI treated and WPC treated. WPI products presented a higher quantity of soluble aggregated proteins (SAP) than the WPC products. Also, HPH treatments had an effect on the quantity of SAP for the WPI products but not for the WPC products. WPI microfluidizer (1 p/55° C., 5 p/55° C.) and Avestin™ ceramic (1 p/55° C., 5 p/55° C.) showed a higher content of SAP compared to the WPI control. Temperature of the treatment at 55° C. and number of recirculation (1 and 5 passes) affected the solubility of the aggregated proteins. We don't see any difference between WPC products because the WPC is composed of 52.16% of proteins but contains also more lactose, fat, and ash than the WPI products. The others constituents of WPC and the quantity of insoluble aggregated protein in WPC had an effect on the proteins treatments. WPI products are composed of 97.90% of proteins and the others constituents had no major effect on the protein treatments.

High-pressure homogenization treatment at a temperature of 55° C. Avestin™ or Microfluid™, 1 or 5 passes) for the WPI modify the solubility of whey proteins at pH 4.6 and the content of soluble aggregates.

TABLE 2

Different protein fraction (total proteins, soluble proteins at pH 6.0 and pH 4.6, IAP and SAP) in WPI and WPC

| Substrates | | Total Proteins (%) | Soluble proteins pH 6.0 (%) | Soluble proteins pH 4.6 (%) | IAP[1] (%) | SAP[2] (%) |
|---|---|---|---|---|---|---|
| WPI | Control | 96.18 | 95.01 | 87.74 | 1.17 | 7.27 |
| WPI | Microfluidiz. 1 p/22° C. | 96.98 | 96.29 | 87.07 | 0.69 | 9.22 |
| WPI | Microfluidiz. 5 p/22° C. | 98.77 | 98.86 | 89.13 | 0.00 | 9.73 |
| WPI | Microfluidiz. 1 p/55° C. | 98.49 | 98.96 | 88.53 | 0.00 | 10.43 |
| WPI | Microfluidiz. 5 p/55° C. | 99.78 | 98.95 | 73.04 | 0.83 | 25.91 |
| WPI | Ceramic 1 p/22° C. | 96.13 | 95.76 | 89.27 | 0.37 | 6.49 |
| WPI | Ceramic 5 p/22° C. | 98.47 | 96.70 | 89.35 | 1.77 | 7.35 |
| WPI | Ceramic 1 p/55° C. | 97.19 | 94.94 | 84.92 | 2.25 | 10.02 |
| WPI | Ceramic 5 p/55° C. | 99.17 | 98.95 | 80.72 | 0.22 | 18.23 |
| WPC | Control | 52.75 | 39.46 | 36.49 | 13.29 | 2.97 |
| WPC | Microfluidiz. 1 p/22° C. | 52.46 | 40.48 | 36.15 | 11.98 | 4.33 |
| WPC | Microfluidiz. 5 p/22° C. | 51.54 | 41.55 | 36.24 | 9.99 | 5.31 |
| WPC | Microfluidiz. 1 p/55° C. | 51.17 | 39.30 | 36.77 | 11.87 | 2.53 |
| WPC | Microfluidiz. 5 p/55° C. | 53.18 | 39.11 | 37.53 | 14.07 | 1.58 |
| WPC | Ceramic 1 p/22° C. | 51.24 | 38.96 | 36.42 | 12.28 | 2.54 |
| WPC | Ceramic 5 p/22° C. | 50.98 | 39.18 | 37.42 | 11.80 | 1.76 |
| WPC | Ceramic 1 p/55° C. | 53.81 | 39.37 | 36.29 | 14.44 | 3.08 |
| WPC | Ceramic 5 p/55° C. | 52.31 | 39.82 | 36.65 | 12.49 | 3.17 |

[1]IAP: Insoluble aggregated proteins = total proteins-soluble proteins pH 6.0
[2]SAP: Soluble aggregated proteins = soluble proteins pH 6.0-soluble proteins pH 4.6

Turbidity

Evaluation of the turbidity of solutions made with WPI with a protein content of 14% w/w by transmittance at λ=700 nm is showed at the FIG. 1. Solutions were made with WPI and the protein content was 14% w/w. Microfluidizer solutions presented a higher transmittance value compared to WPI control. Avestin™ ceramic solutions showed the same tendency as Microfluid™ at 22° C. but a lower transmittance value for the treatment (1 and 5 passes) at 55° C. The solutions were more cloudy for these treatments. It seems from these results that at 55° C. Avestin™ does not reduced aggregation like the Microfluid™ do.

The analysis of WPC products for the turbidity was impossible because the solutions of WPC were very cloudy even for the non-treated sample.

Emulsion

Mean diameter of oil droplets of corn oil-in-water emulsions (0.5% protein, 20% oil) made with WPI and WPC products were compared (Table 3). The oil droplets diameter of emulsions made with WPI was lower than the one made with WPC. The average droplets diameter for WPI control emulsions was 1.41±0.50 μm. The oil droplets size was slightly increasing for the emulsion made with the WPI treated at 55° C. WPI treated by Microfluidization 5 passes/55° C. gave a mean diameter of 1,64±0.63 μm and WPI treated by Avestin ceramic 5 passes/55° C. gave a mean diameter of 1,71±0.90 μm. The size of oil droplets diameter of emulsions made with WPI treated at 22° C. was similar to the one made with WPI control. The mean oil droplets diameter for WPC control was 2.14±1.15 μm. The size of oil droplets was slightly increasing for the emulsion made with WPC microfluidizer 5 passes/55° C. (mean diameter of 2.88±2.31 μm) and emulsion made with WPC Avestin ceramic 5 passes/55° C. (mean diameter of 2.78±2.21 μm).

High-pressure homogenization treatment of WPI and WPC had no positive effect on oil droplets size for stabilized oil in water emulsion. High pressure treatment does not appear to improve emulsifying properties of whey proteins. It does however increase the aggregation properties of the proteins, which sows that protein has been affected by the HPH treatment.

Figure 2:
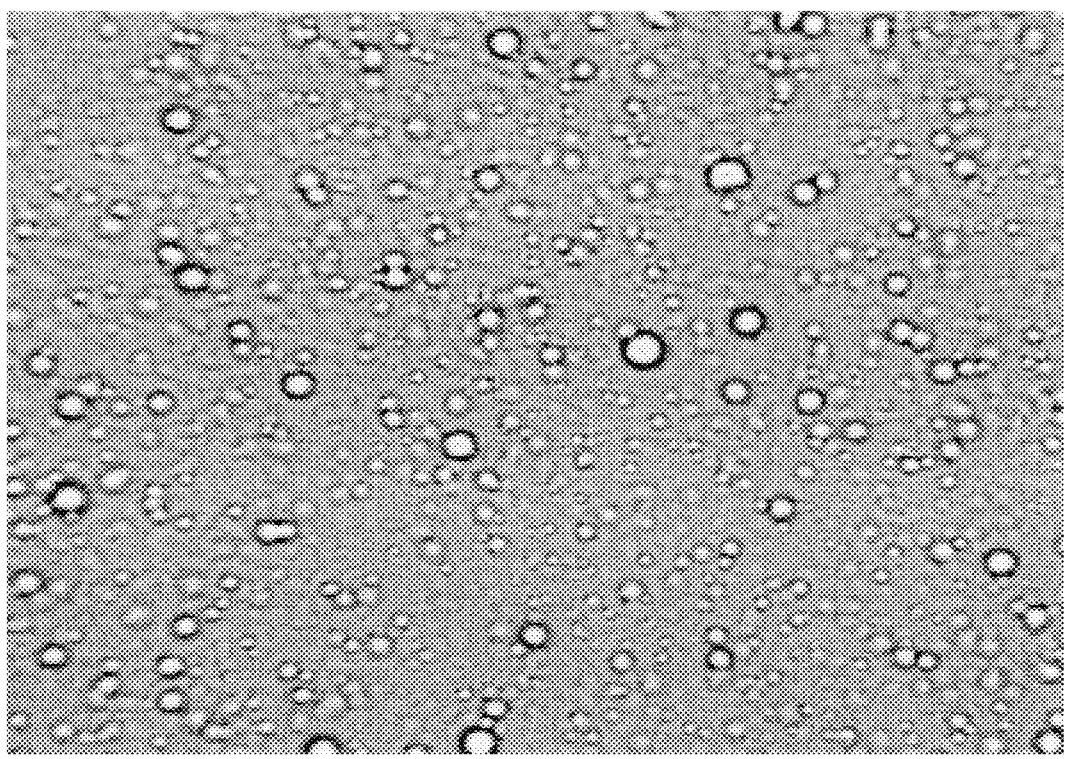
FIG. 2 illustrates emulsion made with WPI control at a magnification of 100×.
Figure 3:
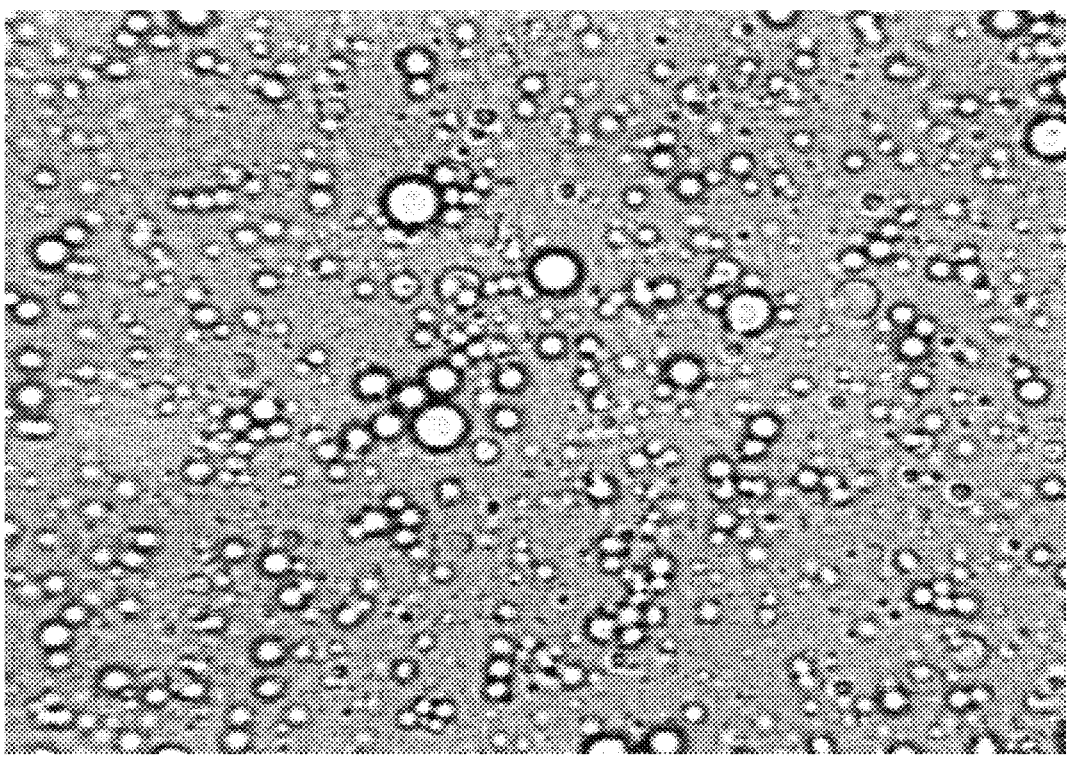
FIG. 3 illustrates emulsion made with WPI Avestin ceramic 1 p/55° C. at a magnification of 100×.
Figure 4:
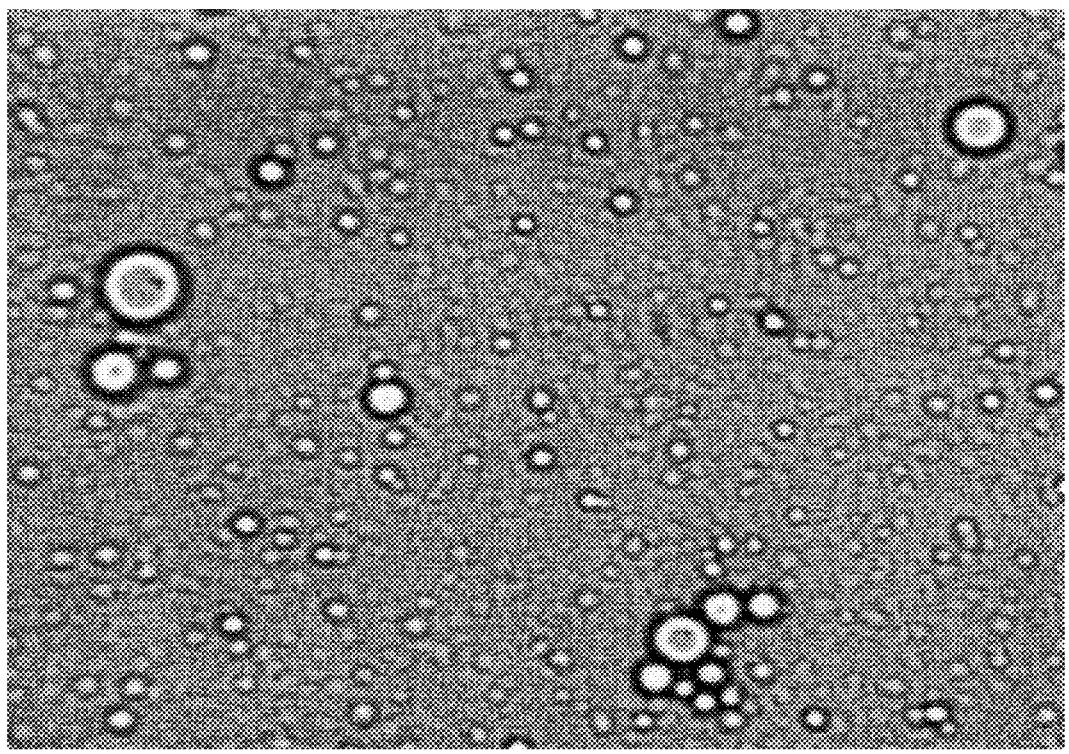
FIG. 4 illustrates emulsion made with WPC control at a magnification of 100×.
Figure 5:
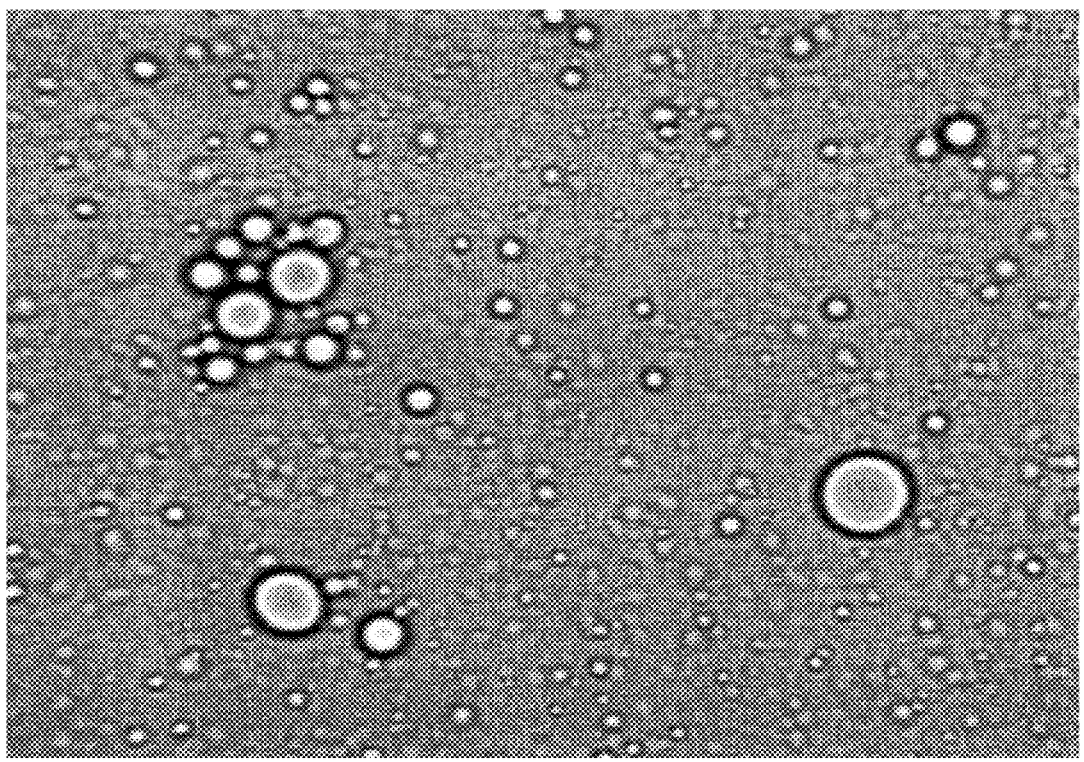
FIG. 5 illustrates emulsion made with WPC Avestin ceramic 1 p/55° C. at a magnification of 100×.

The increase in the average particle size associated to the HPH treatment WPI at 55° C. was associated to an increase in aggregation between fat globules showing aggregating properties of the treated proteins. FIGS. 2 and 3 present the particle size by optical microscopy at magnification 100× of emulsions made with WPI control and WPI Avestin ceramic 1 p/55° C. FIGS. 4 and 5 show the particle size by optical microscopy at magnification 100× of emulsions made with WPC control and WPC Avestin™ ceramic 1 p/55° C.

TABLE 3

Mean diameters of oil droplets for emulsions (0.5% protein, 20% oil) made with WPI and WPC Diameters (Optical microscopy 100x) (μm)

| | Substrates | Mean | SD | Maximum | Minimum |
|---|---|---|---|---|---|
| WPI | Control | 1.41 | 0.50 | 4.92 | 0.63 |
| WPI | Microfluidizer 1 p/22° C. | 1.42 | 0.47 | 4.17 | 0.66 |
| WPI | Microfluidizer 5 p/22° C. | 1.38 | 0.42 | 4.05 | 0.71 |
| WPI | Microfluidizer 1 p/55° C. | 1.46 | 0.49 | 4.12 | 0.66 |
| WPI | Microfluidizer 5 p/55° C. | 1.64 | 0.63 | 4.96 | 0.63 |
| WPI | Ceramic 1 p/22° C. | 1.47 | 0.39 | 4.79 | 0.66 |
| WPI | Ceramic 5 p/22° C. | 1.54 | 0.44 | 3.76 | 0.63 |
| WPI | Ceramic 1 p/55° C. | 1.61 | 0.51 | 5.06 | 0.65 |
| WPI | Ceramic 5 p/55° C. | 1.71 | 0.90 | 10.95 | 0.66 |
| WPC | Control | 2.14 | 1.15 | 8.82 | 0.69 |
| WPC | Microfluidizer 1 p/22° C. | 2.29 | 1.80 | 14.26 | 0.66 |
| WPC | Microfluidizer 5 p/22° C. | 2.24 | 1.46 | 11.36 | 0.68 |
| WPC | Microfluidizer 1 p/55° C. | 2.05 | 1.52 | 12.52 | 0.76 |
| WPC | Microfluidizer 5 p/55° C. | 2.88 | 2.31 | 19.92 | 0.69 |
| WPC | Ceramic 1 p/22° C. | 2.01 | 1.63 | 17.44 | 0.69 |
| WPC | Ceramic 5 p/22° C. | 2.57 | 2.34 | 21.47 | 0.72 |
| WPC | Ceramic 1 p/55° C. | 2.22 | 1.53 | 15.17 | 0.65 |
| WPC | Ceramic 5 p/55° C. | 2.78 | 2.21 | 18.32 | 0.63 |

Gelation

Figure 6:
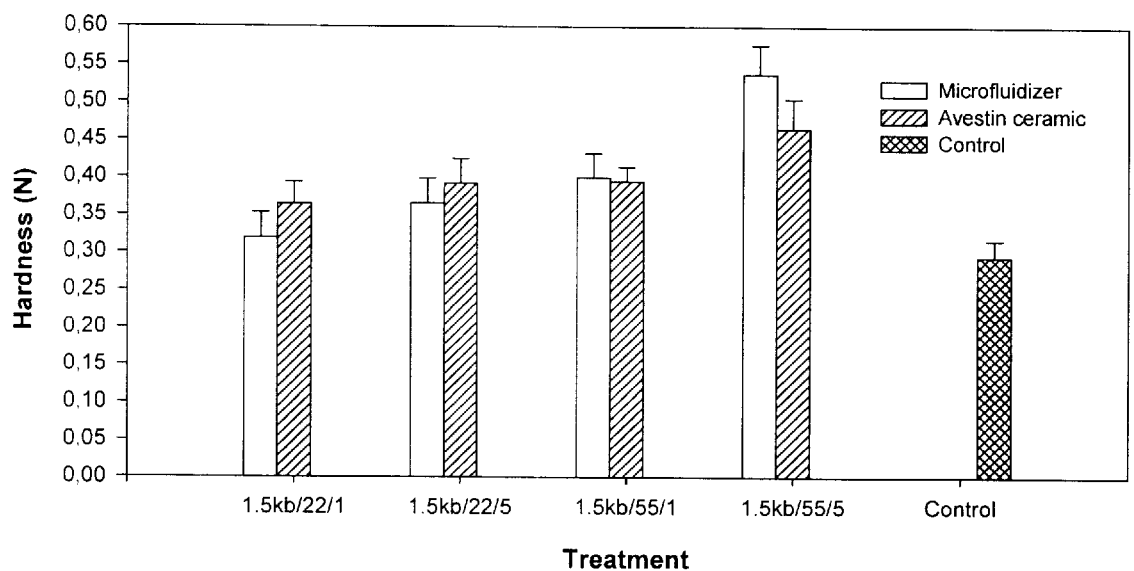
FIG. 6 illustrates effect of WPI treated by HPH on the hardness of gels.

Effect of WPI and WPC treated by HPH on the hardness of gels made with a solution. of protein content of 14% WIW are presented in FIGS. 6 and 7. The hardness of gels produced with WPI treated was increasing compared to the gels made with WPI control. WPI treated by microfluidizer 5 p/55° C. and Avestin™ ceramic 5 p/55° C. produced gels with the highest values of hardness. The hardness of gels made with WPI microfluidizer was very similar of the hardness of gels made with WPI Avestin™ ceramic. The hardness of gels made with WPC control was similar of the hardness of gels made with WPC treated 1 p/22° C. and 5 p/22° C. The hardness of gels produced with WPC treated 1 p/55° C. and 5 p/55° C. was slightly higher then the gels made with WPC control.

The results showed that WPI treated at a temperature of 22° C. and 55° C. by high-pressure homogenization improve the gelation properties of whey proteins. HPH treatment at a temperature of 55° C. for the WPC improve slightly the gelation properties of whey proteins.

Effect of Heating

Table 4 shows the effect of the inlet temperature of a solution of WPI at a concentration of 14% of protein recirculated in an homogenizer Avestin™ C-50 ceramic at a pressure of 1.5 kbar for the production of a gel. Temperature of the solution after 1 pass in the homogenizer was 50.0° C. for the WPI 22° C. and 66.7° C. for the WPI 55° C. The time for made a gel was lower for the WPI 55° C. and the number of recirculation was only 4 passes. The solution of WPI 22° C. was recirculated 8 passes for made a gel and the temperature at the end was around 78.8° C. The temperature at the end of the recirculation for the WPI 55° C. was around 82.7° C.

TABLE 4

Effect of the temperature of a solution of WPI for the production of gel with the homogenizer Avestin ceramic at a pressure of 1.5 kbar

| | | Gelation | | |
|---|---|---|---|---|
| Inlet temperature (° C.) | Temperature after 1 passe (° C.) | Time (min.) | Number of recirculation | Outlet temperature (° C.) |
| WPI 22° C. | 50.0 | 4.42 | 8 | 78.8 |
| WPI 55° C. | 66.7 | 2.58 | 4 | 82.7 |

2.0 STUDY OF CHEESE SAUCE

With the results obtained from the functional properties analysis in the study of WPI and WPC, we have decided to retain two WPI treated by HPH for a reincorporation in a formulation of cheese sauce. WPI Avestin ceramic 1 passe/22° C. and WPI Avestin™ ceramic 1 passe/55° C. were used for the study. These two ingredients have been selected due to the facility to use the Avestin technology and the 1 passe procedure is more acceptable in an industrial process.

The main objective of this experiment was to substitute soy protein isolate (SPI) in a formulation of cheese sauce by whey protein isolate (WPI) treated by dynamic high-pressure homogenization. The rheological properties of the cheese sauces were characterized.

METHODOLOGY

Materials

Soy protein isolate (SPI) was purchased from UFL. The quantity of SPI used in the formulation of cheese sauce control was 3.25%. WPI control, WPI Avestin™ ceramic 1 p/22° C. and WPI Avestin™ ceramic 1 p/55° C. were used for the formulation of the cheese sauce. The quantity of WPI used in the formulation was 1.62% and 1.00%. Cheese sauces were made in triplicate. Table 5 shows the original formulation of the cheese sauce.

TABLE 5

Formulation of cheese sauce

| Ingredients | % by weight |
|---|---|
| Salt | 0.77 |
| Monosodium glutamate | 0.08 |
| White pepper | 0.01 |
| Milk, whole | 65.50 |
| Soy protein isolate | 3.25 |
| Cheddar cheese, six months | 26.09 |
| Sequestrant, i.e., tetrasodium pyrophosphate | 0.30 |
| Fat, i.e., margarine | 4.00 |

Rheological Measurements

Rheological measurements were performed with a shear strain-controlled rheometer (ARES-100 FRT, Rheometric Scientific). Parallel plate geometry was used with a plate diameter of 50 mm. The gap between the two plates was set at 1 mm. The rheological measurements were performed in a step rate test and a dynamic frequency sweep (strain-controlled) test. Analysis were made in duplicate at a room temperature of 20° C. 24 hours after the production of the cheese sauce. All the samples were stand still 5 minutes before running any measurements, to allow some stress relaxation.

Step rate is a steady transient test that applies a constant commanded shear rate of 1.0 s$^{-1}$ for a selected time period of 5 minutes. Cheese sauce viscosity was dependent of the time. When subjected to shear, structure was broken down and the materials reach a minimum thickness. This is the behavior of a thixotropic fluid.

Dynamic rheology analyzed the viscoelastic behavior of cheese sauce and characterized the levels of both viscous and elastic behavior. Dynamic frequency sweep applies a sinusoidal deformation of constant amplitude of 0.56 over a range of frequency of 0.01 at 10 Hz. Small amplitude oscillatory experiments, carried out within the linear viscoelastic region, have the advantage of avoiding destruction in the sample. We get the values of G' elastic modulus (called also the shear storage modulus), G" viscous modulus (called also the shear loss modulus), phase angle ($\delta$) and dynamic viscosity ($\eta^*$) The value of G' is an indication of the character solid or elastic of the products tested. The value of G" is an indication of the character liquid or viscous of the product tested. Phase angle gave an idea of the elastic character compare to the viscous character of the products because tg$\delta$=G"/G'. For a material perfectly elastic $\delta$=0° and $\delta$=90° when it is a material viscous. For a viscoelastic material like a cheese sauce, $\delta$ is situated between 0° and 90°.

RESULTS

Rheological Measurements

Steady Rheology

Figure 8:
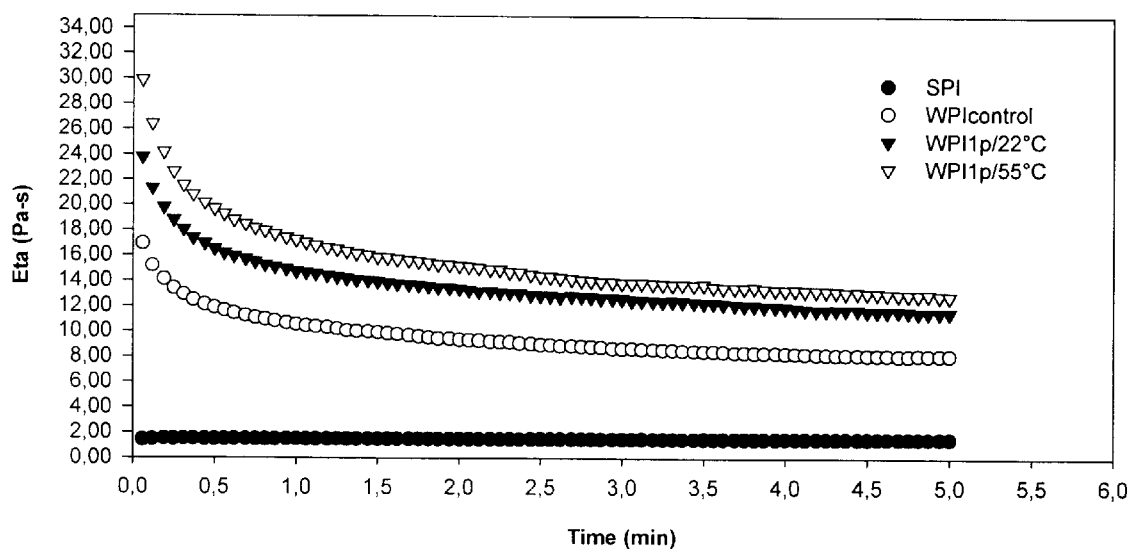
FIG. 8 illustrates Evolution of the viscosity of cheese sauces made with 1.62% of WPI at a shear rate of 1.0 s$^{-1}$.
Figure 9:
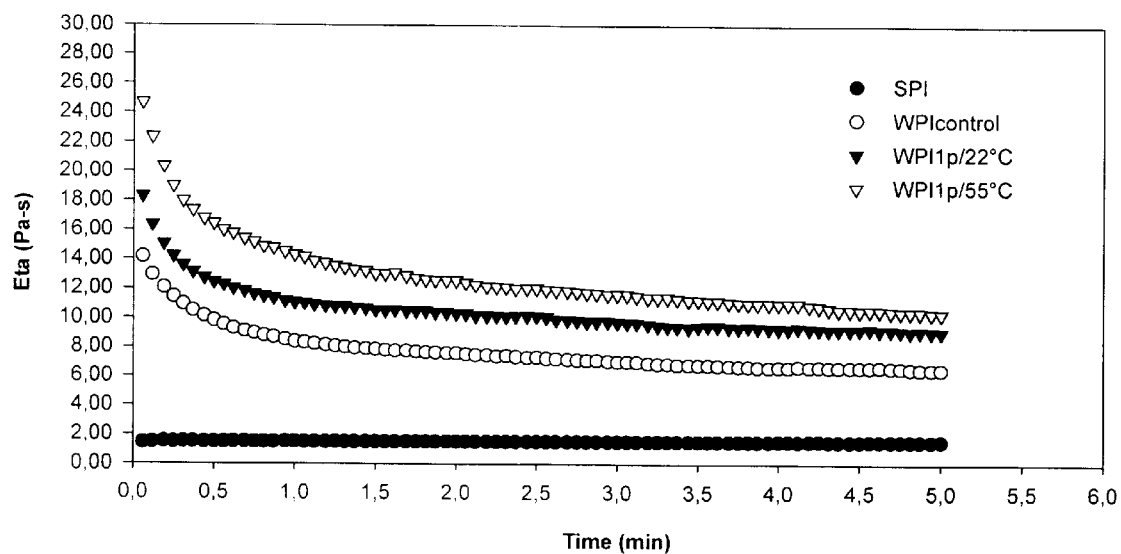
FIG. 9 illustrates Evolution of the viscosity of cheese sauces made with 1.00% of WPI at a shear rate of 1.0 s$^{-1}$.

Evolution of the viscosity of the cheese sauce as a function of time is showed in the FIGS. 8 and 9. The viscosity of cheese sauces made with WPI decreased in function of time. This is the behavior of a thixotropic fluid. The viscosity of SPI cheese sauce remained stable in function of time. Viscosity of the cheese sauces made with WPI ingredients was higher than the one made with SPI. Cheese sauces made with WPI treated by HPH gave a higher value of viscosity than the WPI control for the two levels of incorporation (1.62% and 1.00%). Table 6 presents the viscosity of the cheese sauces after 5 minutes of analysis at a shear rate of 1.0 s$^{-1}$.

TABLE 6

Steady viscosity of cheese sauces at a shear rate of 1.0 s$^{-1}$ after 5 minutes

| Products | Viscosity (Pa-s) Mean | SD |
|---|---|---|
| SPI (3.25%) | 1.52 | 1.61 |
| WPI control (1.00%) | 6.43 | 2.03 |
| WPI 1 p/22° C. (1.00%) | 9.07 | 2.28 |
| WPI 1 p/55° C. (1.00%) | 10.32 | 2.12 |
| WPI control (1.62%) | 8.10 | 2.49 |
| WPI 1 p/22° C. (1.62%) | 11.52 | 3.25 |
| WPI 1 p/55° C. (1.62%) | 12.79 | 1.59 |

Dynamic Rheology

Figure 10:
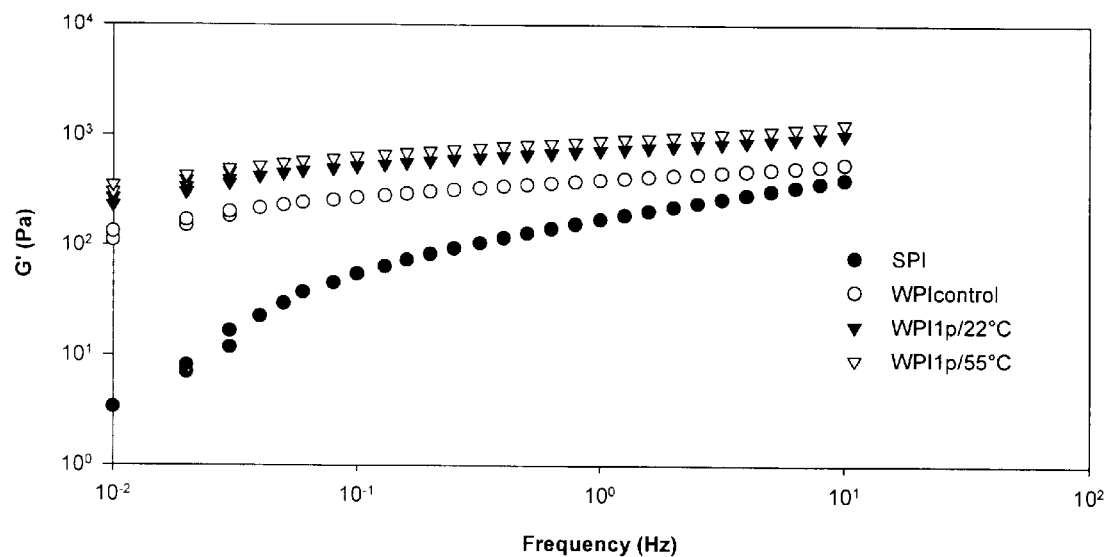
FIG. 10 illustrates the development of elastic modulus with increasing frequency oscillation of cheese sauces made with 1.62% of WPI.
Figure 11:
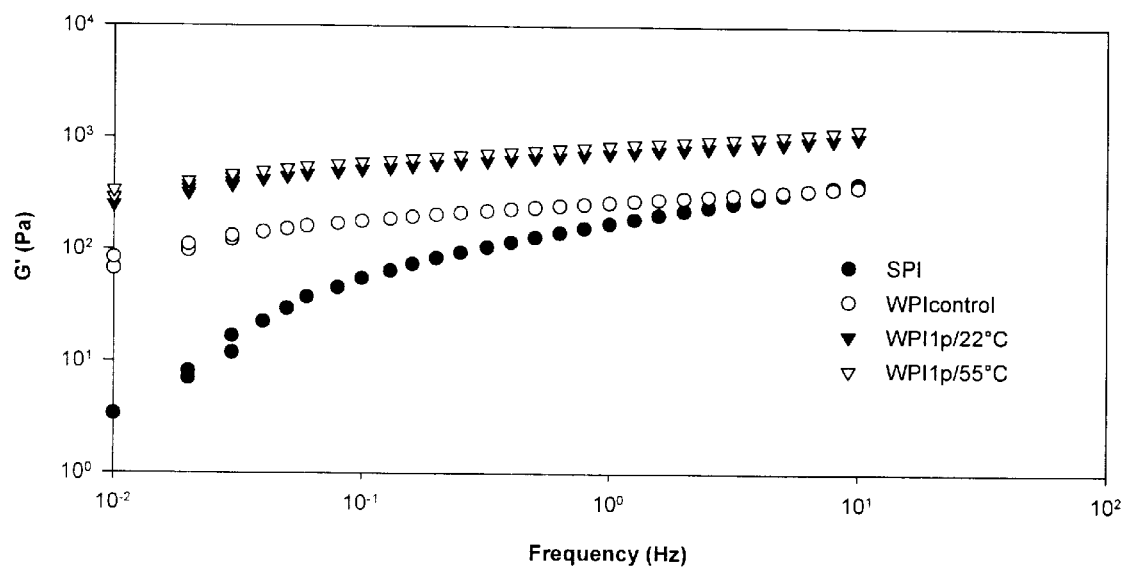
FIG. 11 illustrates the development of elastic modulus with increasing frequency oscillation of cheese sauces made with 1.00% of WPI.

In FIGS. 10 and 11, the G' values at a deformation amplitude of 0.5% are plotted against frequency. The shapes of the curves are quite similar for all cheese sauces made with the WPI, which can be attributed to the fact that all the WPI ingredients must exhibit similar viscoelastic behavior. The shapes of the mechanical spectra showed that cheese sauces made with WPI ingredients have a Theological behavior of a gel type with G' varied slightly with the frequency. The shape of the mechanical spectra for cheese sauce made with SPI is very different. The cheese sauce SPI curve represented a rheological behavior of a solution. Cheese sauces made with WPI treated by HPH gave higher values of G' compared to the WPI control for the two levels of incorporation (1.62% and 1.00%). Cheese sauces made with WPI treated are more elastic than the one made with WPI control.

Figure 12:
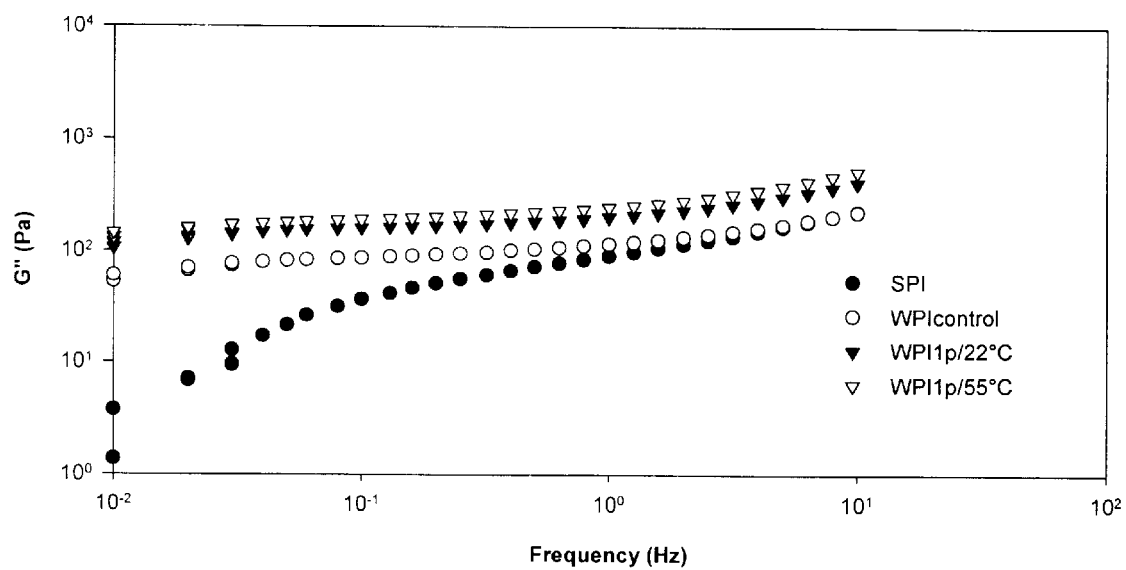
FIG. 12 illustrates the development of viscous modulus with increasing frequency oscillation of cheese sauces made with 1.62% of WPI.
Figure 13:
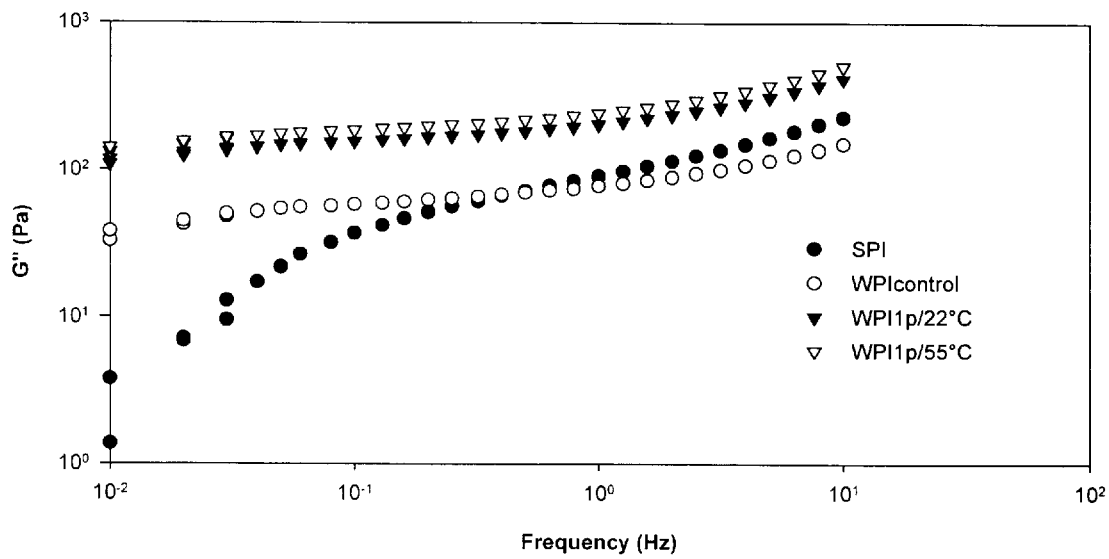
FIG. 13 illustrates the development of viscous modulus with increasing frequency oscillation of cheese sauces made with 1.00% of WPI.

In FIGS. 12 and 13, the G" values at a deformation amplitude of 0.5% are plotted against frequency. Viscous modulus G" of the cheese sauces made with WPI ingredients was higher than the one made with SPI. Cheese sauces made with WPI treated by HPH gave higher values of G" compared to the WPI control for the two levels of incorporation (1.62% and 1.00%). Cheese sauces made with WPI treated are more viscous than the one made with WPI control.

Figure 14:
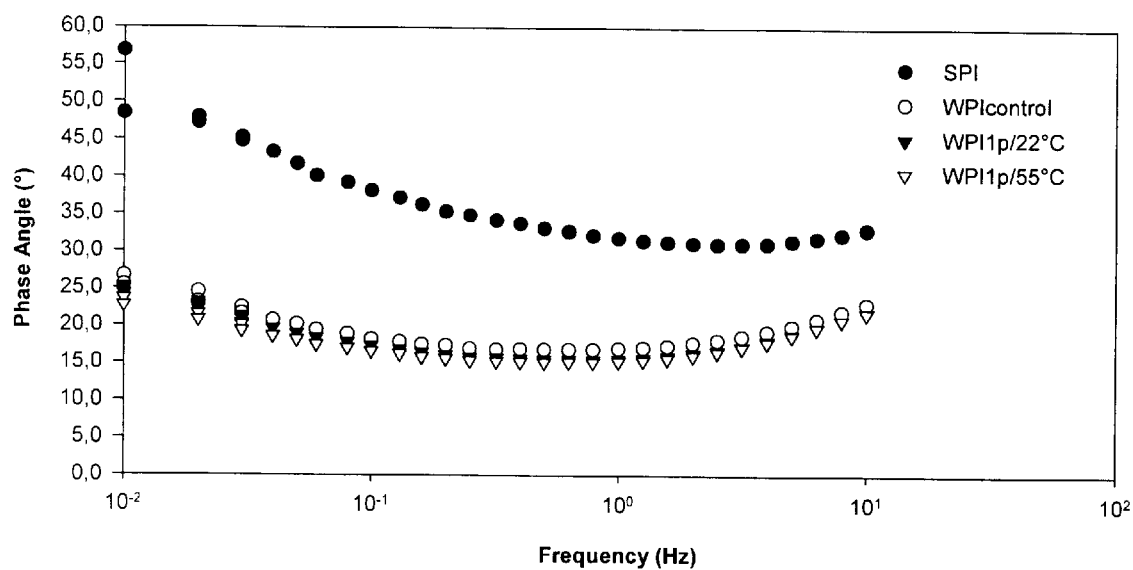
FIG. 14 illustrates values of phase angle as a function of frequency of oscillation for cheese sauces made with 1.62% of WPI.
Figure 15:
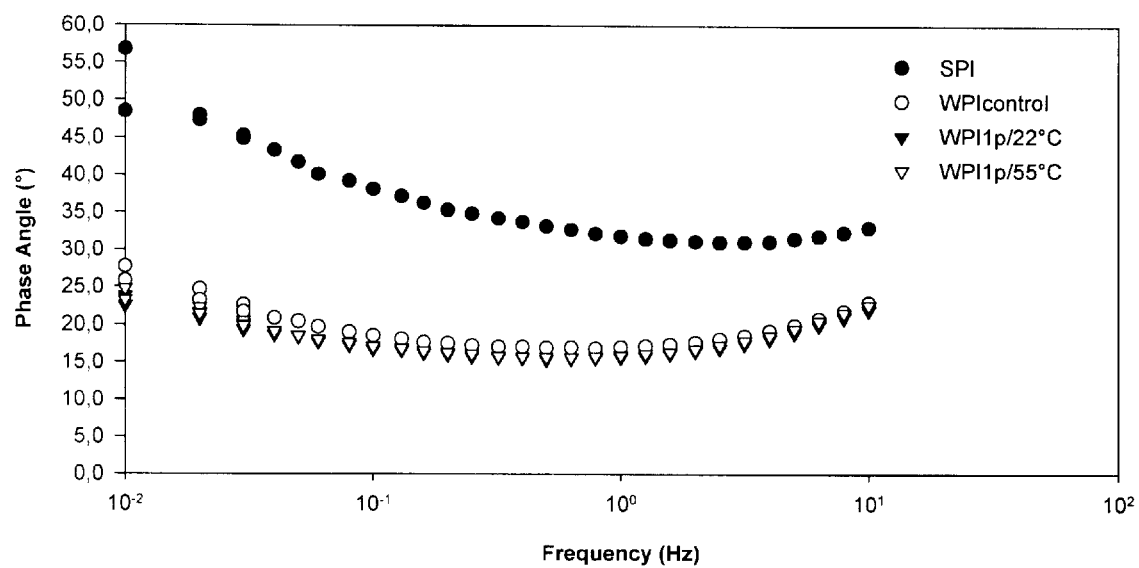
FIG. 15 illustrates values of phase angle as a function of frequency of oscillation for cheese sauces made with 1.00% of WPI.

The phase angle ($\delta$) is used to summarize the viscoelastic character of materials because tg$\delta$=G"/G'. Cheese sauces made with WPI ingredients presented a character more solid than cheese sauce made with SPI because phase angle values were lower for the cheese sauces made with WPI (FIGS. 14 and 15). No differences of phase angle values were observed between the WPI ingredients.

Figure 16:
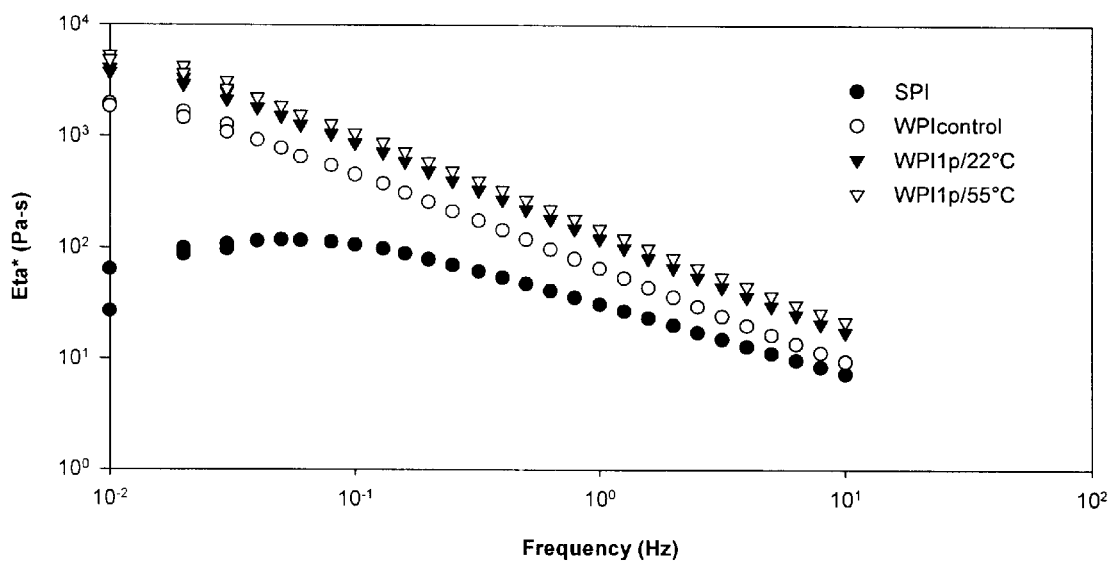
FIG. 16 illustrates dynamic viscosity with increasing frequency of oscillation for cheese sauces made with 1.62% of WPI.
Figure 17:
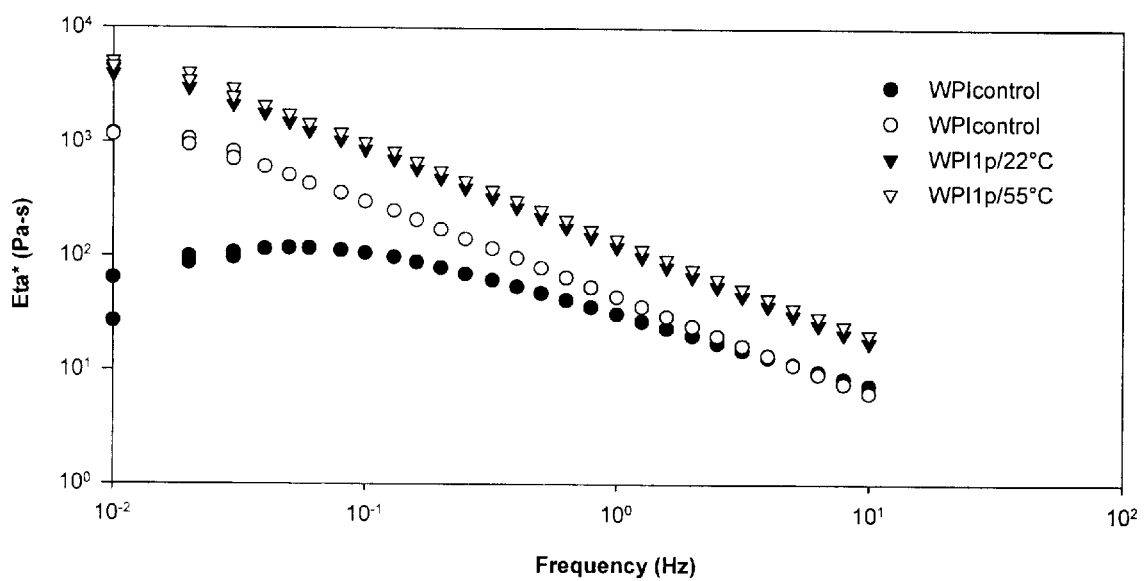
FIG. 17 illustrates dynamic viscosity with increasing frequency of oscillation for cheese sauces made with 1.00% of WPI.

In FIGS. 16 and 17, dynamic viscosity of cheese sauces are presented. Dynamic viscosity of the cheese sauces made with WPI ingredients was higher than the one made with SPI. Cheese sauces made with WPI treated by HPH gave higher values of dynamic viscosity compared to the WPI control for the two levels of incorporation (1.62% and 1.00%).

Table 7 presents the values of modulus G' et G" of cheese sauces at a frequency of 1 Hz and a deformation amplitude of 0.5%. Table 8 shows the values of phase angle and dynamic viscosity of cheese sauces at a frequency of 1 Hz and a deformation amplitude of 0.5%.

TABLE 7

Values of modulus G' et G" of cheese sauces at a frequency of 1 Hz and a deformation amplitude of 0.5%

| Products | Modulus G' (Pa) Mean | SD | Modulus G" (Pa) Mean | SD |
|---|---|---|---|---|
| SPI (3.25%) | 171.77 | 126.19 | 90.69 | 57.08 |
| WPI control (1.00%) | 263.24 | 110.05 | 77.50 | 25.74 |
| WPI 1 p/22° C. (1.00%) | 729.91 | 239.07 | 203.46 | 62.81 |
| WPI 1 p/55° C. (1.00%) | 849.17 | 295.68 | 241.81 | 83.39 |
| WPI control (1.62%) | 391.33 | 151.58 | 115.24 | 34.81 |
| WPI 1 p/22° C. (1.62%) | 730.97 | 321.37 | 200.78 | 82.46 |
| WPI 1 p/55° C. (1.62%) | 896.41 | 331.67 | 245.77 | 94.84 |

TABLE 8

Values of phase angle and dynamic viscosity of cheese sauces at a frequency of 1 Hz and a deformation amplitude of 0.5%

| Products | Phase angle (°) mean | S. D. | Dynamic Viscosity (Pa-s) mean | S. D. |
|---|---|---|---|---|
| SPI (3.25%) | 31.78 | 7.01 | 30.97 | 21.94 |
| WPI control (1.00%) | 16.99 | 2.08 | 43.70 | 17.92 |
| WPI 1 p/22° C. (1.00%) | 15.64 | 0.53 | 120.60 | 39.32 |
| WPI 1 p/55° C. (1.00%) | 15.91 | 0.59 | 140.53 | 48.88 |
| WPI control (1.62%) | 16.96 | 1.77 | 64.95 | 24.69 |
| WPI 1 p/22° C. (1.62%) | 15.51 | 0.73 | 120.65 | 52.79 |
| WPI 1 p/55° C. (1.62%) | 15.27 | 0.33 | 147.93 | 54.89 |

S. D. = Standard deviation

CONCLUSION

First, the results. of the present invention confirm that it is possible to obtained comparable results using the Emulsiflex Avestin technology than the Microfluid technology, and this is of importance since the EmulsiFlex Avestin technology is a more transferable technology to the industry.

WPI give increase emulsion aggregation, gels firmness and thickening properties both in model systems and in food product (cheese sauce) whereas the results for WPC are less evident.

We have shown that the HPH modified the protein properties at temperature below the denaturation temperature at 22/150.0° C. and at 55/166.70° C. (FIG. 4).

| Cheese sauce product : the static viscosity | | |
|---|---|---|
| SPI | 3.25% | 30.97 Pa.S-1 |
| WPI | 1.62% | 64.95 Pa.S-1 |
| WPI/22/1 | 1.62% | 120.5 Pa.S-1 |
| WPI/55/1 | 1.62% | 147.93 Pa.S-1 |

These results represent an increase by 1.8 and 2.3 times vs. the control WPI and of 8 to 10 times vs. the SPI considering the concentration differences.

Costs Considerations:

Considering the fact that the treated sample increase by almost two times the viscosity of the cheese sauce, it is clear from the present results that HPH represent a potential technology for the modification of proteins functionalities which lead to economical benefits.

The present invention will be more readily understood by referring to the following examples which are given to illustrate the invention rather than to limit its scope.

EXAMPLE I

Commercial Applications of the Invention

The pressure-treated proteins obtained by the process of the present invention may be used in fillers or gel food products. At very high homogenization pressures (3 kbar), gelation can be induced without subsequent heat treatment; these gels can be used in gel-like products, such as pudding or gelatin gel products.

Other processing conditions produce proteins with modified functionality. Increase in solubility (dispersion translucidity) results in protein solutions that may be used for soup, cream, or sports drinks.

The HPH is used to modify the emulsification/foaming properties of the proteins to favor their applications in emulsions meat products. As an example, in liver paté, these modified-proteins resulted in a softer texture due to their higher hydration capacity and emulsification.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A continuous process for denaturation of milk proteins for increasing firmness and/or viscosity of a gel, said process consisting of:
    a) subjecting a milk protein solution to a high pressure homogenizer at a pressure of about 500 to about 5000 bar, at a recirculation ranging from 0 to about 50 and at a temperature ranging from about 20° C. to about 80° C. for a time period of passage through said homogenizer of the order of milliseconds for each recirculation, wherein said milk protein solution consists of a protein fraction dispersed in water, which further comprises buffer or salt solution wherein said salt is at a concentration ranging from about 2% to about 35% ww and at a pH adjusted between about 2.0 to about 12.0; and
    b) concentrating the milk protein solution, wherein said milk protein solution obtained in step a) indicates higher viscosity and/or firmness of gels wit respect to viscosity and/or firmness of gels induced by their corresponding non-denatred protein form.

2. The process of claim 1, wherein said denaturation is partial or total.

3. The process of claim 1, wherein said milk protein is whey protein.

4. The process of claim 1, wherein said milk protein is at a concentration of about 35% to 99% w/v.

5. The process of claim 3, wherein said whey protein is a whey concentrate.

6. The process of claim 5, wherein said whey protein is at a concentration of about 35% to about 99% w/v.

7. The process of claim 1, wherein the pH ranges between 6.0 to about 7.0 and said protein solution contains protein at a concentration of about 5% to about 14% w/v.

8. The process of claim 1, wherein said pressure is more than 1500 bar, said temperature is 22° C. or 55° C. and said recirculation is ranging from 1 to 5.

9. A food protein composition, which comprises partially or totally denatured protein, wherein said protein is obtained by the process of claim 1, said denatured protein inducing higher viscosity and/or firmness of gels with respect to viscosity and/or firmness of a gel induced by its corresponding non-denatured protein form.

10. The food protein composition of claim 9, wherein said denatured protein is more soluble than its corresponding non-denatured protein form.

11. A method for increasing viscosity and firmness of a gel composition, said method comprising adding partially or totally denatured protein obtained by the process of claim 1 to a composition to form a gel composition, said denatured protein inducing higher viscosity and/or firmness of said gel composition with respect to viscosity and/or firmness of a gel induced by its corresponding non-denatured protein form.

* * * * *